(12) United States Patent
Kitahara et al.

(10) Patent No.: US 7,962,883 B2
(45) Date of Patent: Jun. 14, 2011

(54) DEVELOPING SEMICONDUCTOR CIRCUIT DESIGN WITH CONDITIONAL FLIPFLOPS TO SAVE POWER CONSUMPTION

(75) Inventors: Takeshi Kitahara, Kawasaki (JP); Tetsuaki Utsumi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 12/195,574

(22) Filed: Aug. 21, 2008

(65) Prior Publication Data
US 2009/0064070 A1 Mar. 5, 2009

(30) Foreign Application Priority Data
Aug. 28, 2007 (JP) ................. 2007-220864

(51) Int. Cl.
*G06F 17/50* (2006.01)
(52) U.S. Cl. ............... 716/132; 716/113; 716/120
(58) Field of Classification Search .......... 716/113, 716/120, 132
See application file for complete search history.

(56) References Cited

U.S. PATENT DOCUMENTS

| | | | |
|---|---|---|---|
| 6,318,911 B1 | 11/2001 | Kitahara | |
| 6,557,143 B1 | 4/2003 | Kitahara et al. | |
| 6,630,853 B1 | 10/2003 | Hamada | |
| 6,958,624 B1 * | 10/2005 | Starr et al. | 326/40 |
| 7,631,209 B2 * | 12/2009 | Schultz | 713/322 |
| 2006/0267627 A1 | 11/2006 | Teh et al. | |
| 2007/0024337 A1 | 2/2007 | Teh et al. | |
| 2008/0028343 A1 * | 1/2008 | Sato et al. | 716/2 |

OTHER PUBLICATIONS

Hamada, et al., A Conditional Clocking Flip-Flop for Low Power H.264/MPEG-4 Audio/Visual Codec LSI, Custom Integrated Circuit Conference Proceedings, 2005.
Teh, et al., Conditional Data Mapping Flip-Flops for Low-Power and High-Performance Systemsm IEEE Transactions on Very Large Scale Integration (VLSI) Systems, vol. 14, No. 12, Dec. 2006.

* cited by examiner

*Primary Examiner* — Naum Levin
(74) *Attorney, Agent, or Firm* — Turocy & Watson, LLP (57) ABSTRACT

This disclosure concerns a semiconductor circuit design method for designing a clock wiring structure supplying a clock to a flip-flop by using a computer. The semiconductor circuit design method comprises setting the flip-flop based on circuit information on a semiconductor integrated circuit; obtaining a control signal controlling the flip-flop; calculating a first evaluation value indicating a power consumption and a magnitude of a clock skew time when clock gating is applied to the flip-flop; setting a gated clock structure clock-gating the flip-flop when the first evaluation value is higher than a first threshold; calculating a second evaluation value indicating the power consumption and a magnitude of a cell area when a low power flip-flop lower in power consumption than the flip-flop is applied to the flip-flop; and replacing the flip-flop by the lower power flip-flop when the second evaluation value is higher than a second threshold.

10 Claims, 8 Drawing Sheets

FLIP-FLOP WITHOUT
A GATED CLOCK STRUCTURE

FIG. 5

FLIP-FLOP WITH
A GATED CLOCK STRUCTURE

FIG. 6

CCK-F/F

DEVELOPING SEMICONDUCTOR CIRCUIT DESIGN WITH CONDITIONAL FLIPFLOPS TO SAVE POWER CONSUMPTION

CROSS-REFERENCE TO RELATED APPLICATIONS

This application is based upon and claims the benefit of priority from the prior Japanese Patent Application No. 2007-220864, filed on Aug. 28, 2007, the entire contents of which are incorporated herein by reference.

BACKGROUND OF THE INVENTION

1. Field of the Invention

The present invention relates to a semiconductor circuit design method.

2. Related Art

Gated clock is a technique conventionally used to save power consumption of a flip-flop or a clock tree. Further, development of a conditional clocking flip-flop (CCK-F/F) and a conditional data mapping flip-flop (CDM-F/F) is underway to save power consumption of the flip-flop itself. The CCK-F/F or the CDM-F/F is normally referred to as "low power F/F" because of lower power consumption than that of a normal flip-flop.

By simple combination of the gated clock and the low power flip-flop, a clock signal is gated and the supply frequency of a clock pulse, therefore, becomes lower. Due to this, even if the low power flip-flop is used, the effect of saving the power consumption is small. Moreover, the low power flip-flop includes exclusive-OR gates or exclusive-NOR gates that are not included in the normal flip-flop, so that the low power flip-flop has a larger cell area. Therefore, if the normal flip-flop is replaced by the low power flip-flop, the cell area disadvantageously increases. That is, if the gated clock and the low power flip-flop are simply combined, the effect of cutting power consumption is not as great as expected while the cell area increases.

Moreover, according to the gated clock, if a gate receiving an enable signal and a clock signal is placed to be away from the flip-flop, then a clock delay time increases and the power consumption for charging or discharging clock wirings increases. In this case, it is preferable to directly transmit the clock signal to the flip-flop rather than to use clock gating with views of saving the power consumption and reducing the clock delay time.

Nevertheless, with a conventional semiconductor circuit design method, it is disadvantageously difficult to set a semiconductor circuit capable of reducing both the power consumption and the clock delay time while using the gated clock and the low power flip-flops.

SUMMARY OF THE INVENTION

A semiconductor circuit design method for designing a clock wiring structure supplying a clock to a flip-flop of a semiconductor circuit by using a computer according to an embodiment of the present invention, the semiconductor circuit design method comprises setting the flip-flop based on circuit information on a semiconductor integrated circuit; obtaining a control signal controlling the flip-flop; calculating a first evaluation value indicating a power consumption and a magnitude of a clock skew time when clock gating is applied to the flip-flop; setting a gated clock structure clock-gating the flip-flop when the first evaluation value is higher than a first threshold; calculating a second evaluation value indicating the power consumption and a magnitude of a cell area when a low power flip-flop lower in power consumption than the flip-flop is applied to the flip-flop; and replacing the flip-flop by the lower power flip-flop when the second evaluation value is higher than a second threshold.

A semiconductor circuit design method for designing a clock wiring structure supplying a clock to a flip-flop of a semiconductor circuit by using a computer according to an embodiment of the present invention, the semiconductor circuit design method comprises setting the flip-flop based on circuit information on a semiconductor integrated circuit; obtaining a control signal controlling the flip-flop; calculating a first evaluation value indicating a power consumption and a magnitude of a clock skew time when clock gating is applied to the flip-flop; setting a gated clock structure clock-gating the flip-flop when the first evaluation value is higher than a first threshold; selecting a type of flip-flop as a replacing candidate flip-flop based on a switching rate of a value held in the flip-flop per unit time; calculating a cell area and the timing margin of the flip-flop when the flip-flop is replaced by the replacing candidate flip-flop; and replacing the flip-flop by the replacing candidate flip-flop when the cell area and the timing margin of the flip-flop fall within allowable ranges, respectively.

DETAILED DESCRIPTION OF THE INVENTION

Embodiments of the present invention will be explained below in detail with reference to the accompanying drawings. Note that the invention is not limited thereto.

First Embodiment

Figure 1:
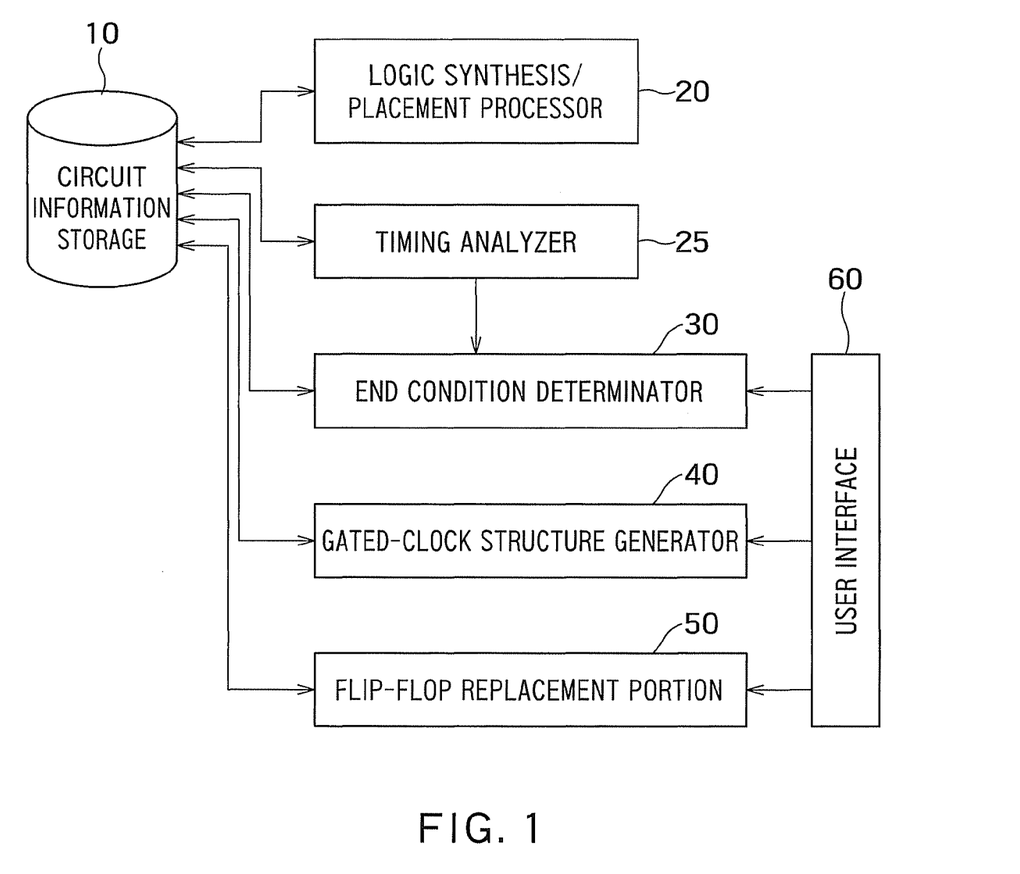
FIG. 1 is a block diagram showing a configuration of a semiconductor circuit design device (computer) according to a first embodiment of the present invention.

FIG. 1 is a block diagram showing a configuration of a semiconductor circuit design device (computer) according to a first embodiment of the present invention. The semiconductor circuit design device designs a clock wiring structure supplying a clock to each of flip-flops of a semiconductor circuit. The semiconductor circuit design device according to the first embodiment includes a circuit information storage 10, a logic synthesis/placement processor 20, a timing analyzer 25, an end condition determination part 30, a gated-clock structure generator 40, a flip-flop replacement portion 50, and a user interface 60. The circuit information storage 10 stores therein circuit information on a semiconductor circuit, that on the gated clock structure, that on low power flip-flops and the like. The logic synthesis/placement processor 20 logically synthesizes constituent elements of the semiconductor circuit and performs a placement processing for arranging the constituent elements. The end condition determination part 30 decides to end the processing if characteristics of the designed semiconductor circuit such as a timing margin satisfy a standard predetermined. The gated-clock structure generator 40 generates a gated clock structure if it is determined to apply the gated clock structure to the flip-flops. The flip-flop replacement portion 50 generates low power flip-flops if it is determined to replace the flip-flops by the low power flip-flops, respectively. The user interface 60 is provided to receive external information.

Figure 2:
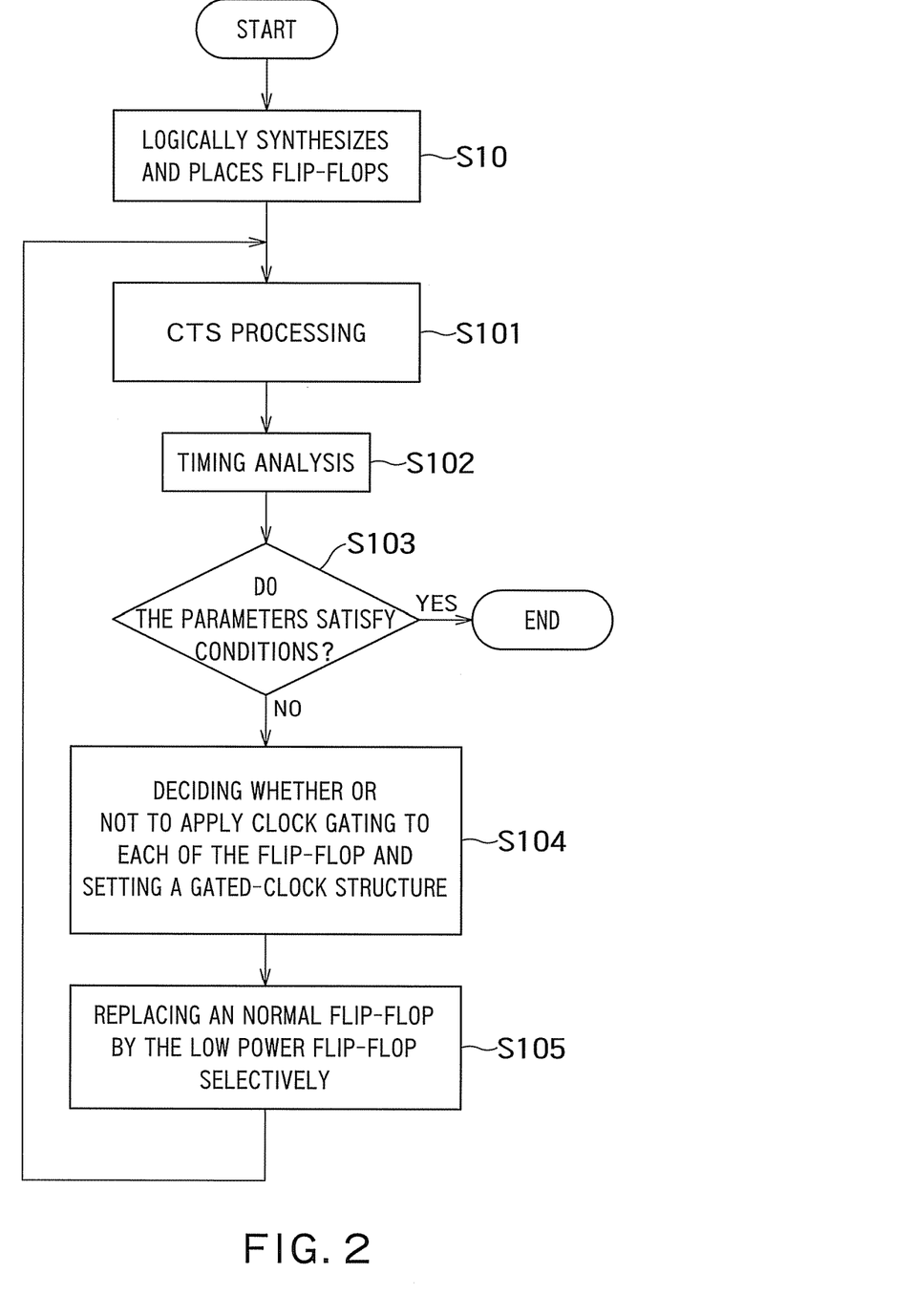
FIGS. 2 to 4 are flowcharts showing a semiconductor circuit design method according to the first embodiment.

FIG. 2 is a flowchart showing a semiconductor circuit design method according to the first embodiment. First, the logic synthesis/placement processor 20 acquires the circuit information on the semiconductor circuit from the circuit information storage 10, and logically synthesizes and places flip-flops based on the circuit information (S10). The flip-flops are sequential circuits for synthesizing various items of LSI-related data and placed in view of an operation timing and the like.

A CTS (Clock Tree Synthesis) processing is then performed based on the circuit information (S101). In the first embodiment, a buffer LCB (Local Clock Buffer) is additionally placed on the circuit. Placement of the flip-flops F/Fs, the buffer LCB, and wirings (clock tree wirings) connecting the flip-flops to the buffer LCB are thereby set. Each of the clock tree wirings supplies a clock signal to each of the flip-flops based on the circuit information on the semiconductor circuit. The clock tree wirings are set to be wired within a chip in light of the circuit constituent elements other than the flip-flops and the buffer LCB.

The timing analyzer 25 performs a timing analysis (S102). The timing analysis is performed by measuring a clock delay time of the clock tree wirings added and wired by the CTS processing, a delay time of a data path, and an operating rate of the semiconductor circuit. At the same time, the timing analyzer 25 measures such parameters as power consumption of the semiconductor circuit and an area of the semiconductor circuit.

The end condition determination part 30 determines whether the parameters measured by the timing analyzer 25 satisfy end conditions (S103). More specifically, the end condition determination part 30 acquires specified values of the parameters via the user interface 60 and compares the specified values of the parameters with the parameters measured by the timing analysis. If the parameters are smaller or lower than the specified values, the end condition determination part 30 determines that the parameters satisfy the end conditions and finishes the processing.

For example, if the timing margin, the power consumption of the semiconductor circuit, the area of the semiconductor circuit, and the operating rate of the semiconductor circuit are equal to or smaller or lower than the specified values, respectively, the end condition determination part 30 finishes the processing. Alternatively, if the value of an evaluation function, obtained by calculating the timing margin, the power consumption of the semiconductor circuit, the area of the semiconductor circuit, and the operating rate of the semiconductor circuit is below a predetermined index value, the end condition determination part 30 can finish the processing. In another alternative, if the steps S101 to S105 are repeatedly executed by a preset number of times, the end condition determination part 30 can finish the processing. If the end conditions are not satisfied (NO at step S103), the steps S104 to S105 are executed.

At the step S104, the gated-clock structure generator 40 decides whether to apply clock gating to each of the flip-flops. If the clock gating is applied to one of the flip-flops, the gated-clock structure generator 40 generates the gated clock structure for the one of the flip-flops. The step S104 is executed according to a flow shown in the flowchart of FIG. 3.

Figure 3:
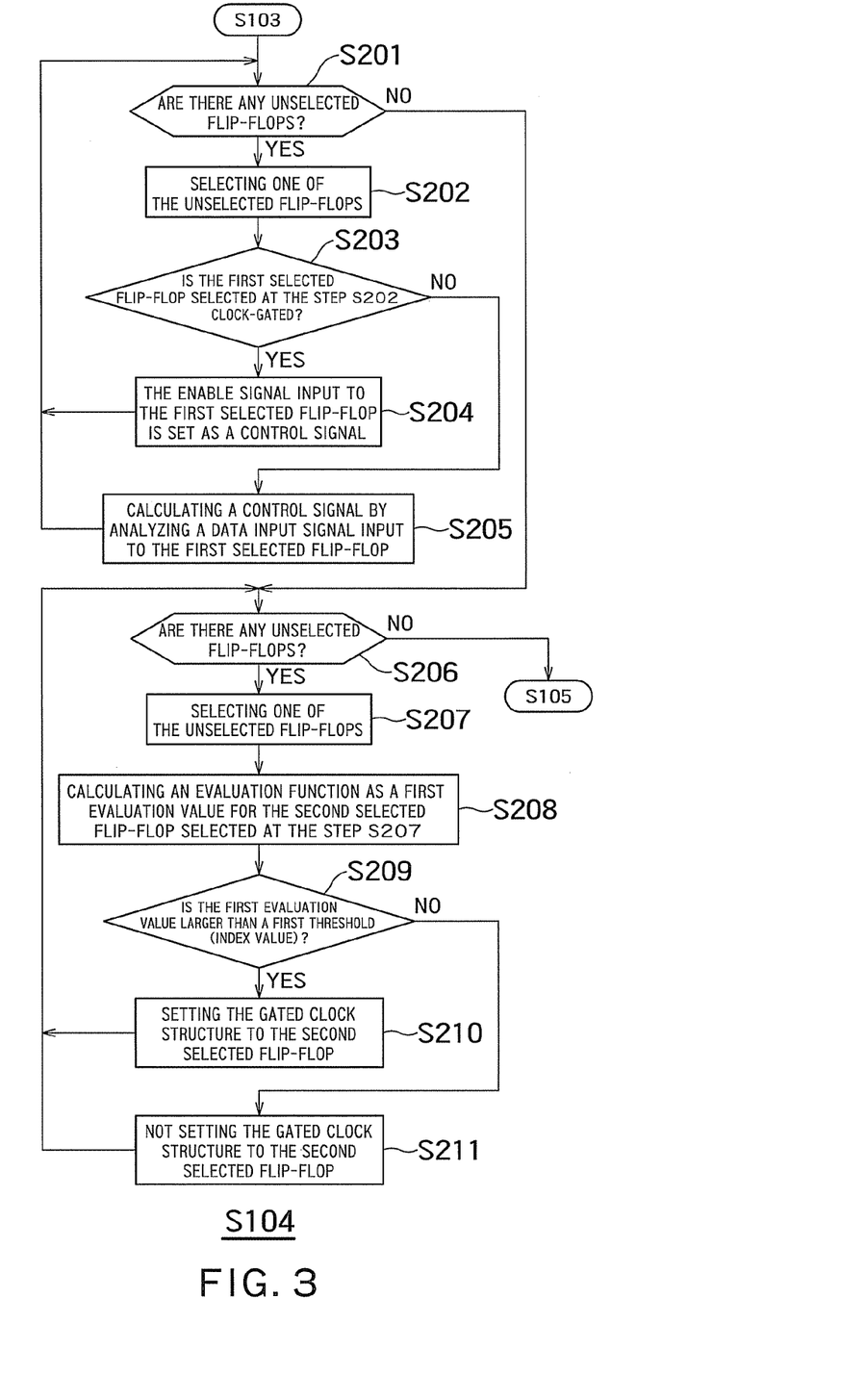

First, when unselected flip-flops are present in the flip-flops included in the circuit information stored in the circuit information storage 10 (YES at step S201), the gated-clock structure generator 40 selects one of the unselected flip-flops (S202). Initially, all the flip-flops are unselected, so that the gated-clock structure generator 40 selects one of the flip-flops and goes to a step S203.

Next, the gated-clock structure generator 40 determines whether the flip-flop selected at the step S202 (hereinafter, "first selected flip-flop") is clock-gated (S203). The determination of clock gating can be made by tracking input of the clock signal to the first selected flip-flop and determining whether a clock-gating cell is present. The clock-gating cell is configured to include, for example, an AND gate or an OR gate to which the clock signal and the enable signal are input. More specifically, therefore, the determination of clock gating can be made by determining whether the AND gate or the OR gate to which the clock signal and the enable signal are input is present on a clock input side of the first selected flip-flop. The gated clock structure is a structure of causing the clock signal to pass through the first selected flip-flop if the enable signal is active (e.g., logically high), and of shutting off the clock signal if the enable signal is inactive (e.g., logically low). Namely, the gated clock structure is a structure of allowing the clock signal to pass through the structure to a flip-flop under control of the enable signal if it is necessary to transfer data to the flip-flop, and of shutting off the clock signal under control of the enable signal if it is unnecessary to transfer data to the first selected flip-flop. If the flip-flop is not a gated-clock flip-flop, the flip-flop has a structure, for example, shown in FIG. 5. If the flip-flop is a gated-clock flip-flop, the flip-flop has a structure, for example, shown in FIG. 6.

If the first selected flip-flop is clock-gated (YES at step S203), the enable signal input to the first selected flip-flop is set as a control signal (S204). The control signal is denoted by, for example, $CTRL_{Fj}$ shown in FIG. 6.

If the first selected flip-flop is not clock-gated (the clock signal input to the first selected flip-flop is not gated (NO at step S203), the gated-clock structure generator 40 calculates a control signal based on a data input signal input to the first selected flip-flop (S205). In this case, the control signal can be calculated by, for example, the following method. Generally, the data input signal to a flip-flop Fj can be represented by Boolean expression $f_{Fj}$ (Q, x1, x2, . . . xn). In the Boolean expression, Q denotes an output value from the flip-flop Fj and x1, x2, . . . xn are variables representing an external input signal and other output signals from the flip-flop. If the Boolean expression $f_{Fj}$ (Q, x1, x2, . . . xn) is rephrased to the following Equation (1), $CTRL_{Fj}$ corresponds to the control signal.

$$f_{Fj}(Q, x1, x2, \ldots xn) = CTRL_{Fj}(x1, x2, \ldots xn) \cdot Q + CTRL_{Fj}(x1, x2, \ldots xn)' \cdot g_{Fj}(Q, x1, x2, \ldots xn) \quad \text{Equation (1)}$$

In the Equation (1), $CTFL_{Fj}(x1, x2, \ldots xn)'$ denotes negation of the control signal $CTRL_{Fj}$. Further, $g_{Fj}(Q, x1, x2, \ldots xn)$ denotes data input signal 'data' shown in FIG. 5 or 6. The control signal $CTRL_{Fj}$ can be calculated by making an algebraic division with respect to $f_{Fj}(Q, x1, x2, \ldots xn)$ with an algebraic divisor set to Q.

In this way, the control signal $CTRL_{Fj}$ of the first selected flip-flop that is not clock-gated can be calculated.

The gated-clock structure generator 40 selects the flip-flops one by one and executes the steps S201 to S205 with respect to each of the flip-flops. If all the flip-flops are selected and the control signal $CTRL_{Fj}$ is calculated for each of the flip-flops (NO at step S201), the gated-clock structure generator 40 executes steps S206 to S211. At the steps S206 to S211, the gated-clock structure generator 40 decides whether to apply the gated clock structure to each of the flip-flops using the control signal $CTRL_{Fj}$ for each of the flip-flops.

The gated-clock structure generator 40 returns all the flip-flops to unselected states and selects the flip-flops one by one again (S207). Initially, the flip-flops are all unselected, so that the gated-clock structure generator 40 selects one of the flip-flops and goes to the step S208.

The gated-clock structure generator 40 calculates an evaluation function as a first evaluation value for the flip-flop selected at the step S207 (hereinafter, "second selected flip-flop") (S208). The evaluation function is defined as, for example, h1 (y1, y2, y3). The evaluation function h1 is represented by arithmetic expressions of parameters y1, y2, and y3.

For example, the parameter y1 denotes the probability that the control signal $CTRL_{Fj}$ is inactive per unit time (probability of $CTRL_{Fj}$=1). If the $CTRL_{Fj}$ is 1, $CTRL_{Fj}'$ is 0. At this time, the data input signal $f_{Fj}$ shown in the Equation (1) is equal to the output signal Q output from the second selected flip-flop. Namely, if the control signal $CTRL_{Fj}$ is inactive, the input of the clock input signal to the second selected flip-flop is stopped. Accordingly, if the parameter y1 is high, it follows that the rate of shutting off the clock signal per unit time is high. The high rate of shutting off the clock signal means that the utilization frequency of the gated clock structure (frequency of gating) is high and that the gated clock structure can efficiently perform gating. That is, as the parameter y1 is higher, the merit gained by applying the gated clock structure to the second selected flip-flop becomes greater.

The parameter y2 denotes the number of flip-flops controlled by the same control signal $CTRL_{Fj}$. As the number of flip-flops controlled by the same control signal $CTRL_{Fj}$ is larger, more flip-flops can be clock-gated. Therefore, as the parameter y2 is larger, the clock gating cell can clock-gate more flip-flops at low power consumption. Further, as the parameter y2 is larger, the merit gained by applying the gated clock structure to the flip-flop becomes greater.

For example, the parameter y3 indicates an index indicating how the flip-flops controlled by the same control signal $CTRL_{Fj}$ are away from one another. More specifically, the distance between two out of the flip-flops controlled by the same control signal $CTRL_{Fj}$ can be set to the y3. Alternatively, the distance to each of the flip-flops controlled by the same control signal $CTRL_{Fj}$ via a common wiring node can be set to the y3. In another alternative, the difference in a clock delay time between two out of the flip-flops controlled by the same control signal $CTRL_{Fj}$ (clock skew) can be set to the y3.

If the flip-flops controlled by the same control signal $CTRL_{Fj}$ are closer to one another, the gated clock structure can clock-gate the flip-flops without increasing the clock skew. It is, therefore, preferable to apply the gated clock structure to each of the flip-flops if the parameter y3 is smaller.

The evaluation function h1 can be predefined as represented by the following Equation (3) using the parameters y1 to y3.

$$h1(y1,y2,y3)=k1 \cdot y1+k2 \cdot y2-k3 \cdot y3 \quad \text{Equation (3)}$$

In the Equation (3), k1, k2, and k3 are weighting coefficients corresponding to the parameters y1 to y3, respectively. As significances of the parameters y1 to y3 are higher, the weighting coefficients k1 to k3 become higher, respectively.

The evaluation function h1 indicates the degree of lowness of the power consumption and the degree of smallness of the clock skew time (the degree of lowness of clock skew) when the gated clock structure is applied to each of the flip-flops. Therefore, as the evaluation function h1 is larger, the power consumption of the clock wiring structure becomes lower and the clock skew of the clock wiring structure becomes lower.

Alternatively, the evaluation function h1 can be predefined as represented by the following Equation (4).

$$h1(y1,y2,y3)=k1 \cdot y1 \cdot k2 \cdot y2/(k3 \cdot y3) \quad \text{Equation (4)}$$

The evaluation function h1 represented by the Equation (4) similarly indicates the degree of lowness of the power consumption and the degree of smallness of the clock skew time (the degree of lowness of the clock skew) if the gated clock structure is applied to each of the flip-flops.

The gated-clock structure generator 40 compares the value of the evaluation function h1 (first evaluation value) obtained at the step S208 with a first threshold (index value) obtained via the user interface 60 (S209). If the first evaluation value is higher than the first threshold (YES at step S209), the gated-clock structure generator 40 sets the gated clock structure to the second selected flip-flop (S210). If the first evaluation value is lower than the first threshold (NO at step S209), the gated-clock structure generator 40 does not set the gated clock structure to the second selected flip-flop (S211).

The gated-clock structure generator 40 selects the flip-flops one by one and executes the steps S206 to S211 with respect to each of the flip-flops. If the gated-clock structure generator 40 selects all the flip-flops and decides whether to set the gated clock structure to each of the flip-flops (NO at step S206), the processing goes to the step S105.

A flip-flop replacement portion 50 decides whether to replace each of the flip-flops by a low power flip-flop, and replaces the flip-flop by the low power flip-flop if necessary (step S105). The step S105 is executed according to a flow shown in the flowchart of FIG. 4. First, when unselected flip-flops are present in the flip-flops included in the circuit information stored in the circuit information storage 10 (YES at step S301), one of the unselected flip-flops is selected (S302). Initially, all the flip-flops are unselected, so that one of the flip-flops and goes to a step S303.

Figure 4:
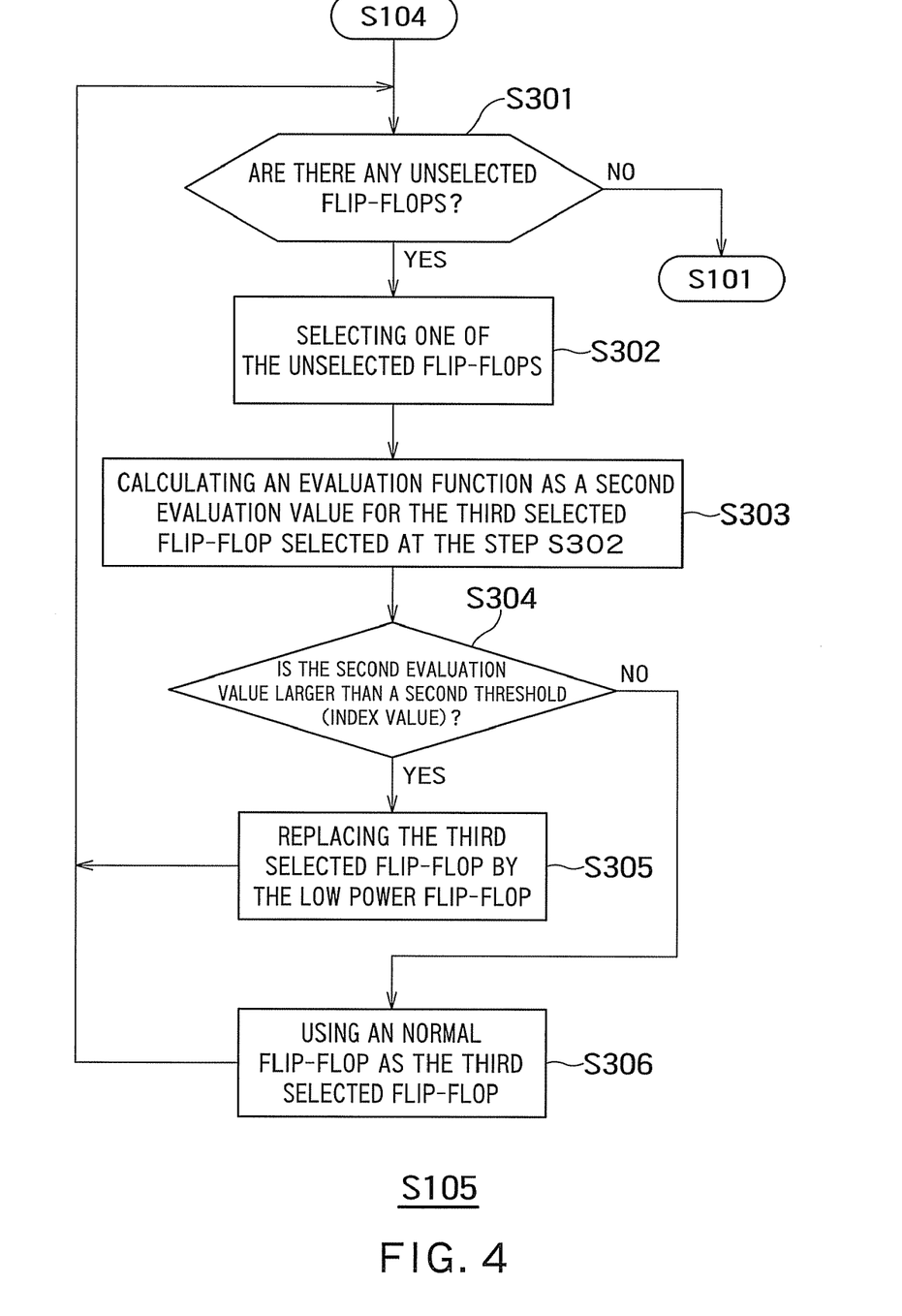

Next, the flip-flop replacement portion 50 calculates an evaluation function h2 serving as a second evaluation value for the flip-flop selected at the step S302 (hereinafter, "third selected flip-flop") (S303). The evaluation function h2 is defined as, for example, h2 (z1, z2, z3, z4, z5). The evaluation function h2 is a function represented by arithmetic expressions of parameters z1, z2, z3, z4, and z5.

The parameter z1 denotes the probability that the control signal $CTRL_{Fj}$ is active per unit time (probability of $CTRL_{Fj}$=0). If the $CRL_{Fj}$ is 0, the data input signal $f_{Fj}$ shown in the Equation (1) is equal to data $g_{Fj}$. Namely, if the control signal $CTRL_{Fj}$ is active, the clock signal is input to the third selected flip-flop. Accordingly, if the parameter z1 is high, it follows that the ratio of causing the clock signal to pass to the third selected flip-flop per unit time is high. The high ratio of causing the clock signal to pass to the third selected flip-flop per unit time means that the utilization frequency of the third selected flip-flop is high. In this case, if the third selected flip-flop is replaced by a low power flip-flop, the effect of saving the power consumption is great. Namely, as the parameter z1 is higher, the merit gained by replacing the flip-flop by the low power flip-flop becomes greater.

The parameter z2 denotes a flag indicating whether the gated clock structure is applied to the third selected flip-flop. For example, the parameter z2 is set to a numeric value equal to or greater than 1 if the gated clock structure is not applied to the third selected flip-flop, and set to 0 if the gated clock structure is applied to the third selected flip-flop. By so setting the z2, the third selected flip-flop to which the gated clock structure is not applied is not replaced by the low power flip-flop or the probability of replacing the third selected flip-flop by the low power flip-flop can be set low.

Figure 7:
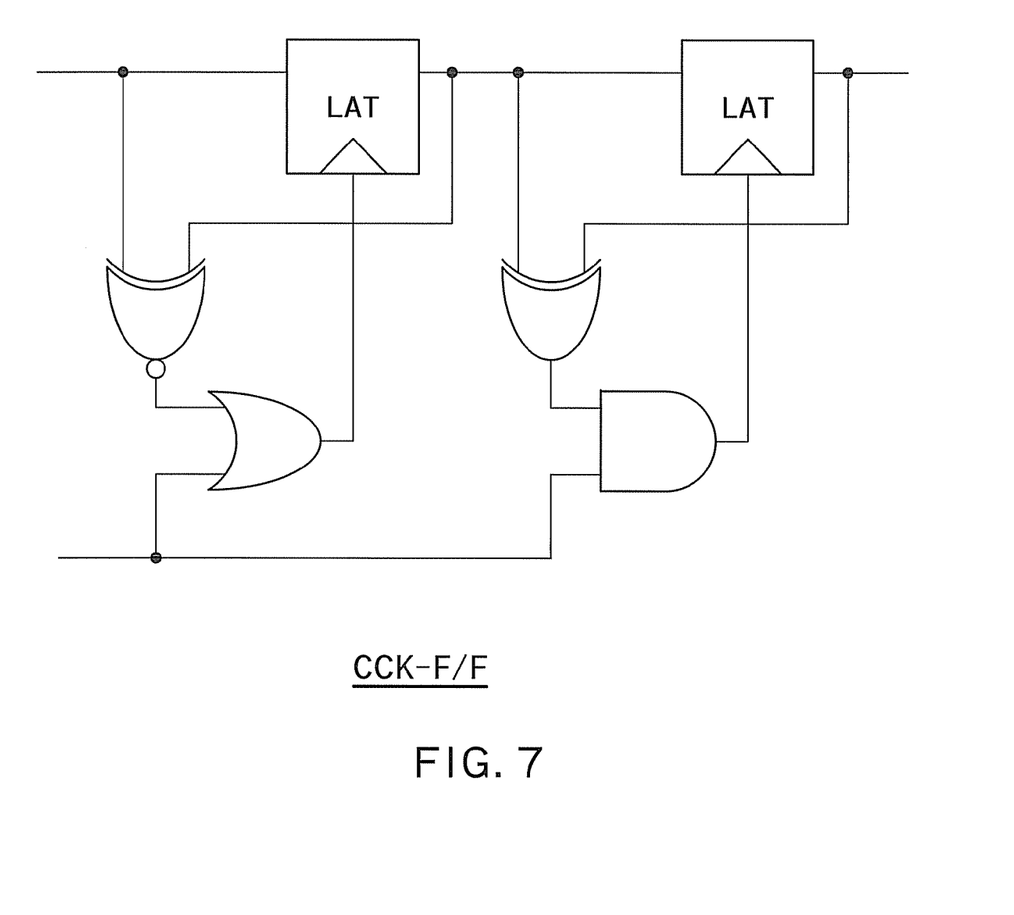
FIG. 7 shows an example of the CCK-F/F.

The parameter z3 denotes a switching rate of a value held by the third selected flip-flop. If the switching rate of the value held by the low power flip-flop shown in FIG. 7 is high, the switching rate of each of the AND gates or the OR gates in the low power flip-flop increases. This means that the power consumption increases if the third selected flip-flop is replaced by the low power flip-flop. It is, therefore, preferable to apply a normal flip-flop to the third selected flip-flop if the switching rate is high.

The parameter z4 denotes a difference in area ("area difference") between the normal flip-flop and the lower power flip-flop. The low power flip-flop is, for example, a CCK-F/F or a CDM-F/F and larger in cell area than the normal flip-flop. It is, therefore, preferable that the parameter z4 is smaller.

The parameter z5 denotes a timing margin of the third selected flip-flop. Since the low power flip-flop includes the exclusive-OR gates or exclusive-NOR gates, the low power flip-flop has tighter setup constraint than that of the normal flip-flop by as much as the presence of the exclusive-OR gates or exclusive-NOR gates. Preferably, therefore, if the timing margin is large, the third selected flip-flop is replaced by the low power flip-flop.

Using the parameters z1 to z5, the evaluation function h2 serving as the second evaluation value is predefined as represented by the following Equation (5).

$$h2(z1,z2,z3,z4,z5)=c1 \cdot z1+c2 \cdot z2-c3 \cdot z3-c4 \cdot z4+c5 \cdot z5 \quad \text{Equation (5)}$$

In the Equation (5), c1 to c5 are weighting coefficients corresponding to the parameters c1 to c5, respectively. As significances of the parameters z1 to z5 are higher, the weighting coefficients c1 to c5 become higher, respectively. The evaluation function h2 is calculated based on whether the gated clock structure is applied to the third selected flip-flop, the timing margin, the lowness of the power consumption and the cell area when the third selected flip-flop is replaced by the low power flip-flop. If the evaluation function h2 is greater, it is more preferable to replace the third selected flip-flop by the low power flip-flop.

Alternatively, the evaluation function h2 can be rephrased to a function represented by the following Equation (6).

$$h2(z1,z2,z3,z4,z5)=c1 \cdot z1 \cdot c2 \cdot z2 \cdot c5 \cdot z5/(c3 \cdot z3 \cdot c4 \cdot z4) \quad \text{Equation (6)}$$

The evaluation function h2 is 0 if the gated clock structure is applied to the third selected flip-flop (if z2=0). Accordingly, if the evaluation function h2 represented by the Equation (6) is used and the gated clock structure is applied to the third selected flip-flop, the flip-flop replacement portion 50 does not replace the third selected flip-flop by the low power flip-flop.

The flip-flop replacement portion 50 compares the value of the evaluation function h2 (second evaluation value) obtained at the step S303 with a second threshold (index value) obtained via the user interface 60 (S304). If the second evaluation value is higher than the second threshold (YES at step S304), the flip-flop replacement portion 50 replaces the third flip-flop by the low power flip-flop (S305). If the second evaluation value is lower than the second threshold (NO at step S304), the flip-flop replacement portion 50 uses the normal flip-flop as the third flip-flop (S306).

The flip-flop replacement portion 50 selects the flip-flops one by one and executes the steps S303 to S306 with respect to each of the flip-flops. If the flip-flop replacement portion 50 selects all the flip-flops and decides whether to replace each of the flip-flops by the low power flip-flop (NO at step S301), the processing returns to the step S101.

If the low power flip-flops are already set to the circuit information, it suffices that the flip-flop replacement portion 50 executes the steps S303 to S306 with one of the low power flip-flop set as the third selected flip-flop. For example, if the second evaluation value is higher than the second threshold, the flip-flop replacement portion 50 replaces the low power flip-flop serving as the third selected flip-flop by the normal flip-flop. If the second evaluation value is lower than the second threshold, the flip-flop replacement portion 50 leaves the low power flip-flop unchanged without replacement.

Thereafter, the CTS processing is performed again at the step S101 shown in FIG. 2 and the timing analyzer 25 performs a timing analysis (S102). If the parameters measured by the timing analysis do not satisfy the end conditions (NO at step S103), the steps S104, S105, S101, and S102 are repeatedly executed. At this time, the steps S104, S105, S101, and S102 can be repeatedly executed while changing the first or second evaluation function. If the parameters measured by the timing analysis satisfy the end conditions (YES at step S103), the design of the semiconductor circuit is finished.

Figure 5:
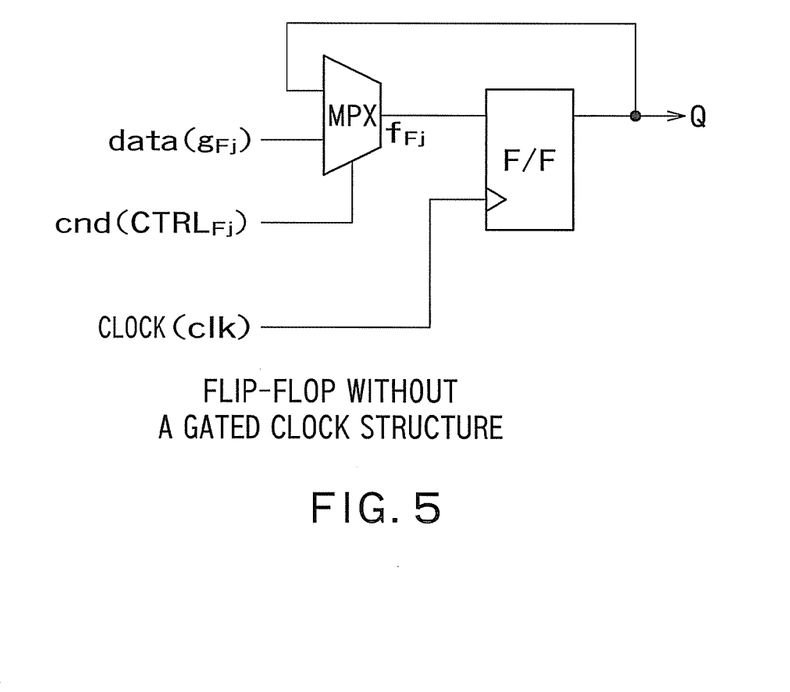
FIG. 5 is a block diagram showing an example of the normal flip-flop.

FIG. 5 is a block diagram showing an example of the normal flip-flop. A multiplexer MPX selectively outputs the data or the output Q from the flip-flop F/F as $f_{Fj}$ to the flip-flop F/F. The flip-flop F/F receives the output $f_{Fj}$ from the multiplexer MPX based on a clock signal clk and outputs the output $f_{Fj}$.

Figure 6:
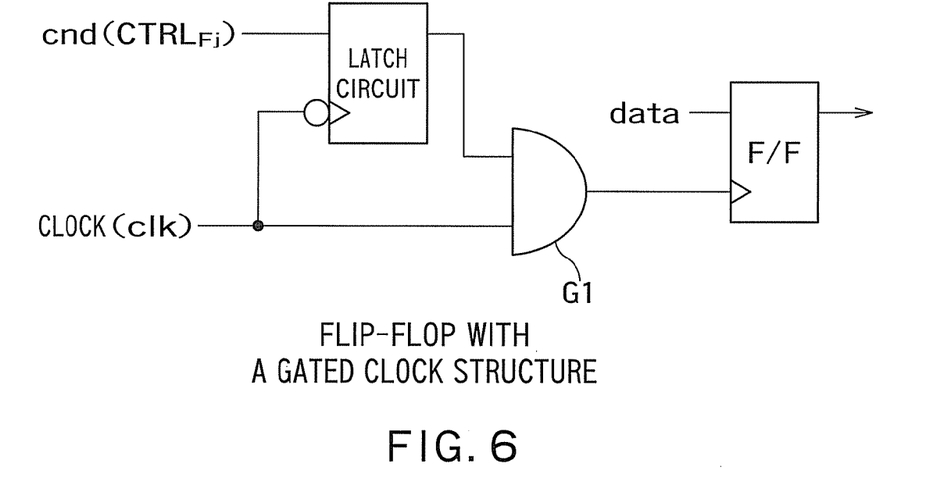
FIG. 6 is a block diagram showing an example of the gated clock structure.

FIG. 6 is a block diagram showing an example of the gated clock structure. A latch circuit latches a control signal cnd based on a clock signal having a reversed phase with respect to a phase of the clock signal clk. If the latched control signal cnd is high level, an AND gate G1 causes the clock signal clk to pass through the flip-flop F/F. If the latched control signal cnd is low level, the AND gate G1 shuts off the clock signal clk.

The low power flip-flop may be either the CCK-F/F or the CDM-F/F. FIG. 7 shows an example of the CCK-F/F.

According to the first embodiment, the gated clock structure can be applied to each flip-flop or the flip-flop can be replaced by the low power flip-flop in view of the parameters such as the power consumption, the timing margin, and the cell area. It is, therefore, possible to design a semiconductor circuit lower in power consumption and lower in clock skew or smaller in cell area. The significance of each of the parameters such as the power consumption, the timing margin, and the cell area can be changed according to the corresponding weighting coefficient. Therefore, by setting high the weighting coefficient corresponding to the parameter the standard of which is strict, the semiconductor circuit compliant with the parameters can be designed. Besides, by repeatedly executing the application of each of or one of the gated clock structure and the low power flip-flop and the timing analysis, it is possible to easily design a semiconductor circuit compliant with specifications.

Alternatively, in the first processing of the first embodiment, the steps S101, S102, and S103 can be skipped and the step S104 and the following steps can be executed based on design circuit data obtained by the synthesis/placement processing (S10).

The parameters y1 to y3 and the parameters z1 to z5 constituting the evaluation functions h1 and h2, respectively are not limited to those stated above and another parameters may be added. Alternatively, two out of the parameters y1 to y3 may be combined to constitute the evaluation function h1. Two to four out of the parameters z1 to z5 may be combined to constitute the evaluation function h2.

Second Embodiment

Figure 8:
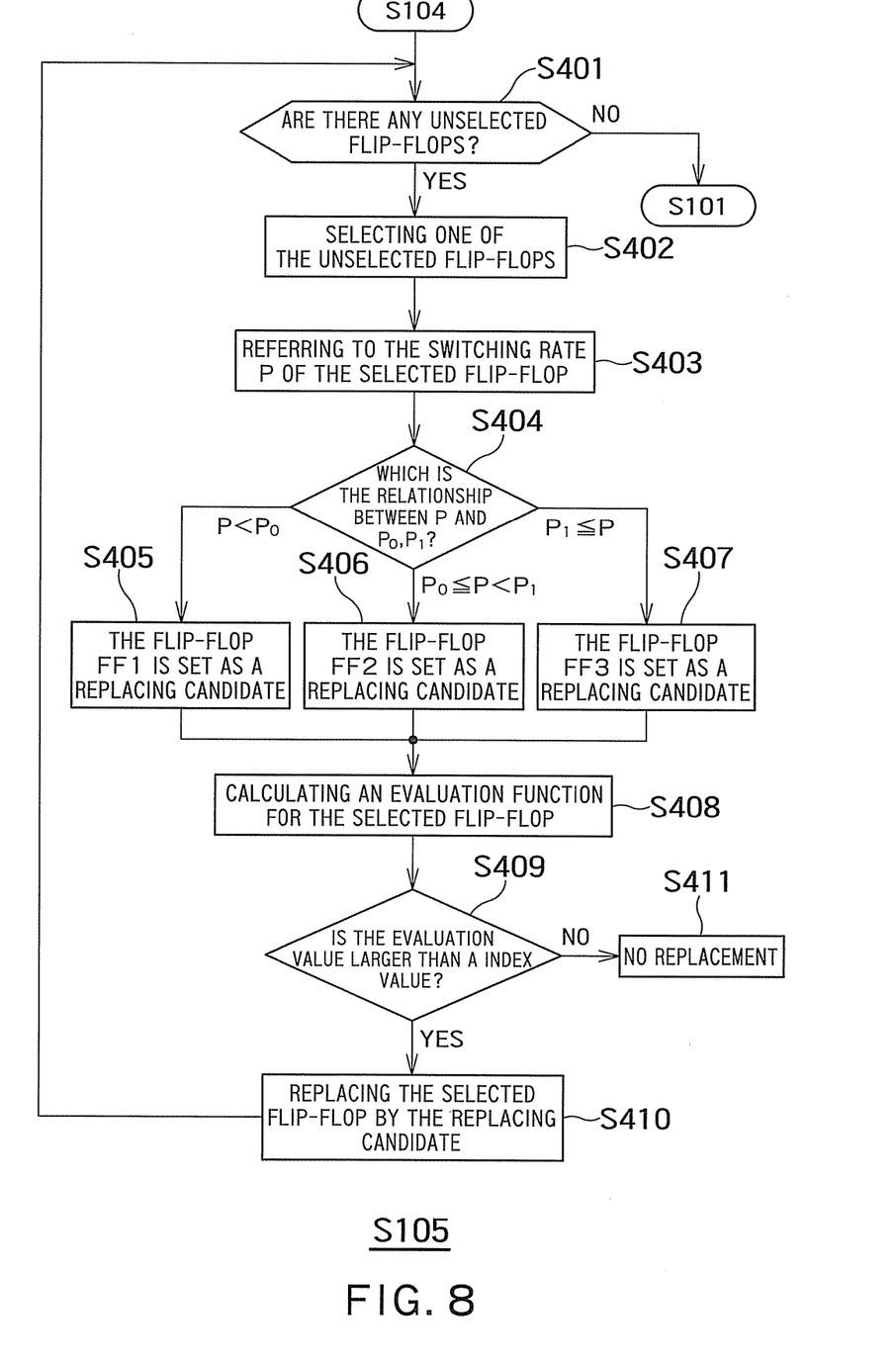
FIG. 8 is a flowchart showing a low power flip-flop replacement step according to a second embodiment of the present invention.

FIG. 8 is a flowchart showing a low power flip-flop replacement step according to a second embodiment of the present invention. In the second embodiment, the flip-flop replacement portion 50 selects a flip-flop having the lowest power consumption from among a plurality of low power flip-flops and applies the selected low power flip-flop to a flip-flop. Other steps S10 to S104 according to the second embodiment are similar to those according to the first embodiment.

Figure 9:
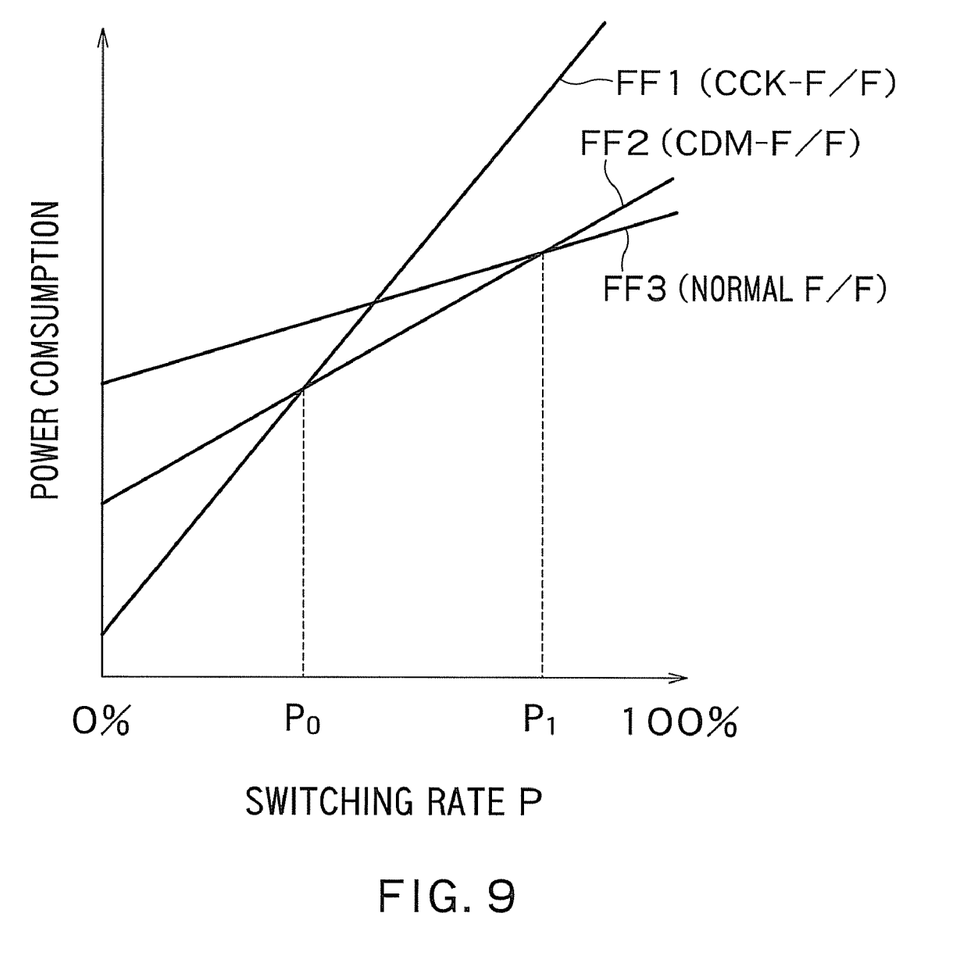
FIG. 9 is a graph showing a relationship between switching rate and power consumption.

As shown in FIG. 9, the magnitude relation in power consumption among the CCK-F/F, the CDM-F/F, and the normal flip-flop changes according to the switching rate p. The switching rate p is a probability that a value held by one flip-flop changes per unit time. For example, if the switching rate p is in a range from 0 to p0, the CCK-F/F denoted by FF1 is lower in power consumption than the two other flip-flops. If the switching rate p is in a range from p0 to p1, the CDM-F/F denoted by FF2 is lower in power consumption than the two other flip-flops. If the switching rate p is equal to or higher than p1, the normal flip flop denoted by FF3 is lower in power consumption than the two other flip-flops. The flip-flop replacement portion 50 applies the flip-flop lowest in power consumption using the relationship between the switching rate and the power consumption shown in FIG. 9 to a flip-flop. The relationship between the switching rate and the power consumption can be acquired from the outside via the user interface 60.

First, as shown in FIG. 8, if unselected flip-flops are present in the flip-flops included in the circuit information stored in the circuit information storage 10 (YES at step S401), the flip-flop replacement portion 50 selects one of the unselected flip-flops (S402). Initially, all the flip-flops are unselected, so that the flip-flop replacement portion 50 selects one of the flip-flops and goes to a step S403.

Next, flip-flop replacement portion 50 refers to the switching rate p of the flip-flop (S403). If the switching rate p is lower than p0, the low power flip-flop FF1 (CCK-F/F) is set as a replacing candidate (S405). If the switching rate p is equal to or higher than p0 and lower than p1, the low power flip-flop FF2 (CDM-F/F) is set as a replacing candidate (S406). If the switching rate p is equal to or higher than p1, the normal flip-flop FF3 is set as a replacing candidate (S407).

The flip-flop replacement portion 50 then calculates the evaluation function h2 if the third selected flip-flop is replaced by the replacing candidate flip-flop (S408). For example, as the evaluation function h2, the function represented by the Equation (5) or (6) can be used. Alternatively, the evaluation function h2 can be defined as $h2=c6 \cdot \Delta S + c7 \cdot \Delta TD$ or $h2=c6 \cdot \Delta S \cdot c7 \cdot \Delta TD$ using an increase $\Delta S$ of the cell area and an increase $\Delta TD$ of the timing margin as parameters. It is to be noted that c6 and c7 are weighting coefficients corresponding to the parameters $\Delta S$ and $\Delta TD$, respectively.

If the value of the evaluation function h2 is lower than the index value and the cell area and the timing margin fall within their allowable ranges, respectively (YES at step S409), the flip-flop replacement portion 50 replaces the third selected flip-flop by the replacing candidate flip-flop (S410). If the value of the evaluation function h2 is higher than the index value or the cell area and the timing margin are out of their allowable ranges, respectively (NO at step S409), the flip-flop replacement portion 50 does not replace the third selected flip-flop by the replacing candidate flip-flop (S411). That is, the flip-flop replacement portion 50 leaves the initially set flip-flop unchanged.

The flip-flop replacement portion 50 selects the flip-flops one by one and executes the steps S403 to S411 with respect to each of the flip-flops. If the flip-flop replacement portion 50 selects all the flip-flops and decides whether to replace each of the flip-flops by the low power flip-flop (NO at step S401), the processing returns to the step S101.

According to the second embodiment, the flip-flop replacement portion 50 can replace each of the flip-flops by the flip-flop selected from among a plurality of low power flip-flops and the normal flip-flop or from among a plurality of low power flip-flops based on the switching rate. According to the second embodiment, therefore, it is possible to design a semiconductor circuit lower in power consumption than the semiconductor circuit designed according to the first embodiment.

If the clock signal input to the flip-flop is gated, the switching rate when the clock gating cell causes the clock signal to pass through the flip-flop (the enable signal is 1) can be used.

Moreover, the number of replacing candidate flip-flops at the steps S405 to S407 is not necessarily limited to one, but the replacing candidate flip-flops can be used as parameters by adding a parameter z6 to the evaluation function h2. In this alternative, if it is determined at the step S409 that the flip-flop is replaced by the low power flip-flop, the low power flip-flop that is to replace the flip-flop is also decided.

In the flowchart shown in FIG. 8, three different kinds of flip-flops FF1 to FF3 are used. However, two different kinds of flip-flops can be used instead of the flip-flops FF1 to FF3. Further, four or more different kinds of flip-flops can be used instead of the flip-flops FF1 to FF3.

In this case, for example, the number of different kinds of flip-flops used for the replacing candidate flip-flops can be represented by a parameter Z6. For example, if the parameter Z6 is equal to 1, the replacing candidate flip-flops are FF1 and FF2. That is, the number of different kinds of flip-flops used for the replacing candidate flip-flops is two. If the parameter Z6 is equal to 2, the replacing candidate flip-flops are FF1 to FF3. That is, the number of different kinds of flip-flops used for the replacing candidate flip-flops is three. If the parameter Z6 is equal to 3, the replacing candidate flip-flops are FF1 to FF4. That is, the number of different kinds of flip-flops used for the replacing candidate flip-flops is four.

The invention claimed is:

1. A semiconductor circuit design method for designing a clock wiring structure supplying a clock to a flip-flop of a semiconductor circuit by using a computer, the computer comprising a logic synthesis processor, a gated-clock structure generator and a flip-flop replacement portion, the method comprising:

in the logic synthesis processor, setting the flip-flop based on circuit information on a semiconductor integrated circuit;

in the gated-clock structure generator, obtaining a control signal controlling the flip-flop; calculating a first evaluation value indicating a power consumption and a magnitude of a clock skew time when clock gating is applied to the flip-flop; and generating a gated clock structure for the flip-flop when the first evaluation value is higher than a first threshold;

in the flip-flop replacement portion, selecting a type of flip-flop as a replacing candidate flip-flop based on a switching rate of a value held in the flip-flop per unit time; calculating a cell area and a timing margin of the flip-flop when the flip-flop is replaced by the replacing candidate flip-flop; and replacing the flip-flop by the replacing candidate flip-flop when the cell area and the timing margin of the flip-flop fall within allowable ranges, respectively.

2. The semiconductor circuit design method according to claim 1, wherein the first evaluation value is calculated by using a function of at least two parameters among a probability that the control signal disables the clock from being input to the flip-flop, number of flip-flops controlled by the control signal, and a distance between two out of the flip-flops controlled by the control signal or the clock skew time among the flip-flops controlled by the control signal.

3. The semiconductor circuit design method according to claim 2, wherein the first evaluation value is defined by an equation 3, where h1 denotes the first evaluation value:

$$h1(y1,y2,y3)=k1 \cdot y1+k2 \cdot y2-k3 \cdot y3 \quad \text{Equation (3)}$$

in the equation 3, y1 denotes the probability that the control signal disables the clock from being input to the flip-flop, y2 denotes the number of flip-flops controlled by the control signal, y3 denotes the distance between two out of the flip-flops controlled by the control signal or the clock skew time among the flip-flops controlled by the control signals and k1 to k3 are weighting coefficients according to significances of the y1 to y3, respectively.

4. The semiconductor circuit design method according to claim 2, wherein the first evaluation value is defined by an equation 4, where h1 denotes the first evaluation value:

$$h1(y1,y2,y3)=k1 \cdot y1 \cdot k2 \cdot y2/(k3 \cdot y3) \quad \text{Equation (4)}$$

in the equation 4, y1 denotes the probability that the control signal disables the clock from being input to the flip-flop, y2 denotes the number of flip-flops controlled by the control signal, y3 denotes the distance between two out of the flip-flops controlled by the control signal or the clock skew time among the flip-flops controlled by the control signal, and k1 to k3 are weighting coefficients according to significances of the y1 to y3, respectively.

5. The semiconductor circuit design method according to claim 1, wherein at the selecting the replacing candidate flip-flop, a flip-flop lowest in the power consumption is selected as the replacing candidate flip-flop based on the switching rate.

6. The semiconductor circuit design method according to claim 1, further comprising:
after the selecting the replacing candidate,
in the flip-flop replacement portion, calculating a second evaluation value indicating the cell area and the magnitude of the timing margin of the flip-flop when the flip-flop is replaced by the replacing candidate flip-flop; and
replacing the flip-flop to the replacing candidate flip-flop when the second evaluation value is within an allowable range, wherein
the second evaluation value is calculated by a function of at least two parameters among a probability that the control signal controls the clock to pass through the flip-flop, a numeric value indicating whether the flip-flop is clock-gated, the switching rate of the value held in the flip-flop per unit time, an area difference between the flip-flop and the replacing candidate flip-flop, and a timing margin of the flip-flop.

7. The semiconductor circuit design method according to claim 6, wherein
the second evaluation value is defined by an equation 5, $$h2(z1,z2,z3,z4,z5)=c1 \cdot z1+c2 \cdot z2-c3 \cdot z3-c4 \cdot z4+c5 \cdot z5 \quad \text{Equation (5)}$$

where h2 denotes the second evaluation value:
in the equation 5, z1 denotes the probability that the control signal controls the clock to pass through the flip-flop, z2 denotes the numeric value indicating whether the flip-flop is clock-gated, z3 denotes the switching rate of the value held in the flip-flop per unit time, z4 denotes the area difference between the flip-flop and the low power flip-flop, z5 denotes the timing margin of the flip-flop, and c1 to c5 are weighting coefficients according to significances of the z1 to z5, respectively.

8. The semiconductor circuit design method according to claim 6, wherein
the second evaluation value is defined by an equation 6, $$h2(z1,z2,z3,z4,z5)=c1 \cdot z1 \cdot c2 \cdot z2 \cdot c5 \cdot z5/(c3 \cdot z3 \cdot c4 \cdot z4) \quad \text{Equation (6)}$$

where h2 denotes the second evaluation value:
in the equation 6, z1 denotes the probability that the control signal controls the clock to pass through the flip-flop, z2 denotes the numeric value indicating whether the flip-flop is clock-gated, z3 denotes the switching rate of the value held in the flip-flop per unit time, z4 denotes the area difference between the flip-flop and the low power flip-flop, z5 denotes the timing margin of the flip-flop, and c1 to c5 are weighting coefficients according to significances of the z1 to z5, respectively.

9. The semiconductor circuit design method according to claim 1, wherein
the second evaluation value is calculated when the first evaluation value is lower than the first threshold, and
the flip-flop is not replaced by the low power flip-flop when the second evaluation value is lower than the second threshold.

10. The semiconductor circuit design method according to claim 1, the computer further comprising an end condition determinator,
the method further comprising:
in the end condition determinator, calculating the power consumption, the cell area, and the timing margin of the flip-flop after replacing the flip-flop by the low power flip-flop; and finishing circuit design when the power consumption, the cell area, and the timing margin of the flip-flop are compliant with a predetermined standard.

* * * * *